US012534314B2

(12) United States Patent
Valentin

(10) Patent No.: US 12,534,314 B2
(45) Date of Patent: Jan. 27, 2026

(54) SYSTEM FOR PREVENTING SEMITRAILER COLLISIONS WITH A LOADING RAMP

(71) Applicant: JVJ-VALENTIN HOLDING APS, Sonderborg (DK)

(72) Inventor: Jan Valentin, Sonderborg (DK)

(73) Assignee: JVJ-VALENTIN HOLDING APS, Sonderborg (DK)

( * ) Notice: Subject to any disclaimer, the term of this patent is extended or adjusted under 35 U.S.C. 154(b) by 869 days.

(21) Appl. No.: 17/768,718

(22) PCT Filed: Oct. 2, 2020

(86) PCT No.: PCT/EP2020/077681
§ 371 (c)(1),
(2) Date: Apr. 13, 2022

(87) PCT Pub. No.: WO2021/073899
PCT Pub. Date: Apr. 22, 2021

(65) Prior Publication Data
US 2024/0132308 A1    Apr. 25, 2024
US 2024/0228200 A9    Jul. 11, 2024

(30) Foreign Application Priority Data

Oct. 17, 2019   (DK) .......................... PA 2019 01222

(51) Int. Cl.
*B65G 69/00* (2006.01)
(52) U.S. Cl.
CPC .................... *B65G 69/005* (2013.01)
(58) Field of Classification Search
CPC .... B65G 69/00; B65G 69/003; B65G 69/005; B65G 69/34
See application file for complete search history.

(56) References Cited

U.S. PATENT DOCUMENTS 4,911,270 A * 3/1990 Hudson .................. B60T 3/00
                                                     188/32
4,936,731 A * 6/1990 Noble .................. B65G 69/006
                                                     414/584
(Continued)

FOREIGN PATENT DOCUMENTS

DE           583 404 C       3/1933
WO          96/12665 A1      5/1996
(Continued)

OTHER PUBLICATIONS

Machine translation of specification of DE583404C into English language, 3 pages.
(Continued)

*Primary Examiner* — Vishal R Sahni
(74) *Attorney, Agent, or Firm* — Francis J. Maguire; WARE FRESSOLA MAGUIRE & BARBER LLP

(57) ABSTRACT

A system for preventing semitrailer collisions with a loading ramp (10) comprising: —a sensor unit (100) comprising a sensor and configured for sensing when the rear end of a semitrailer (12) is approaching a loading ramp (10); —a guide block (200) adapted to be positioned on the ground, laterally and/or medially to the opening of a loading ramp; —the guide block comprises a first wheel blocking means configured as a sled (210) adapted for supporting the tread of a rear tire of the semitrailer, and moves from a forwarded position relative to said loading ramp to a retracted position relative to the ramp when being pushed by the rear tire as the semitrailer is reversing towards the ramp; —the sensor unit is configured to send a blocking signal to said guide block (200) when the distance between said rear end of said semitrailer (12) and said loading ramp (10) is below a preset threshold, wherein said wheel blocking means locks its position in response to said blocking signal, thereby blocking the movement of said sled; —a rain flap (14) isolation (Continued)

device adapted for preventing said rear tire and its rain flap from touching each other while said rear tire is positioned within said sled during its movement from a forwarded position relative to said loading ramp to a retracted position relative to said loading ramp when being pushed by said rear tire as said semitrailer is reversing towards said loading ramp.

2 Claims, 7 Drawing Sheets

(56) References Cited

U.S. PATENT DOCUMENTS

| | | | | |
|---|---|---|---|---|
| 5,553,987 | A * | 9/1996 | Ellis | B65G 69/005 |
| | | | | 414/584 |
| 5,582,498 | A | 12/1996 | Springer et al. | |
| 5,762,459 | A * | 6/1998 | Springer | B65G 69/005 |
| | | | | 188/32 |
| 5,934,857 | A * | 8/1999 | Alexander | B65G 69/005 |
| | | | | 414/584 |
| 6,082,952 | A * | 7/2000 | Alexander | B65G 69/005 |
| | | | | 414/584 |
| RE37,570 | E | 3/2002 | Springer et al. | |
| 6,773,221 | B2 * | 8/2004 | Belongia | B65G 69/005 |
| | | | | 414/584 |
| 2003/0007850 | A1 * | 1/2003 | Belongia | B65G 69/005 |
| | | | | 414/584 |
| 2020/0354176 | A1 | 11/2020 | Valentin | |

FOREIGN PATENT DOCUMENTS

| | | | | |
|---|---|---|---|---|
| WO | WO-2014125040 A1 * | 8/2014 | | B65G 69/001 |
| WO | WO-2019091644 A1 * | 5/2019 | | B65G 69/005 |

OTHER PUBLICATIONS

Danish Search Report, in English language, for application No. PA 2019 01222 dated Mar. 27, 2020, 3 pages.
International Search Report (ISR), International Application No. PCT/EP2020/077681, mailed Dec. 12, 2020, 5 pages.
Written Opinion of the U+International Searching Authority, International Application No. PCT/EP2020/077681, mailed Dec. 12, 2020, 8 pages.

* cited by examiner

SYSTEM FOR PREVENTING SEMITRAILER COLLISIONS WITH A LOADING RAMP

BACKGROUND OF THE INVENTION

The present invention relates to systems for preventing semitrailer collisions with loading ramps. Loading ramps are generally designed to receive a semitrailer with the rear end first. Hence, the driver of the semitrailer will have to reverse the semitrailer towards the loading ramp. Optical devices are often present at the loading ramp to alert the driver when he is in place in front of the loading ramp. However, for some reason, the driver does not pay attention to the warning signal and collides the semitrailer with the loading ramp. Since, many types of semitrailers arrive at a loading ramp each day, it is difficult to position a physical stop in front of the rear wheels of the semitrailer. The distance between the rear wheels and the rear end of the semitrailer simply varies too much from one type of semitrailer to another.

WO2019091644 discloses a system for preventing semitrailer collisions with a loading ramp. The system comprises a sensor and guide block. The sensor is configured for sensing when the rear end of a semitrailer is approaching a loading ramp. The guide block is adapted to be positioned on the ground. The guide block comprises wheel blocking means configured for supporting the tread of a rear tire of the semitrailer. The wheel blocking means is configured to move from a forwarded position relative to the loading ramp to a retracted position relative to the loading ramp as the semitrailer is reversing towards said loading ramp. The sensor is configured to send a blocking signal to the guide block when the distance between the rear end of the semitrailer and the loading ramp is below a preset threshold, thereby blocking the movement of the wheel blocking means. There is a risk, that this type of wheel blocking means may interfere with the rear tire's rain flap, thereby damaging it or even tearing it off.

SUMMARY OF THE INVENTION

It is an object of the present invention to overcome the above-mentioned problems.

One aspect relates to a system for preventing semitrailer collisions with a loading ramp comprising:
  a sensor unit comprising a sensor, said sensor unit configured for sensing when the rear end of a semitrailer is approaching a loading ramp;
  a guide block adapted to be positioned on the ground, laterally and/or medially to the opening of a loading ramp; wherein the guide block comprises a first wheel blocking means configured as a sled adapted for supporting the tread of a rear tire of a semitrailer, and configured to move, preferably passively, from a forwarded position relative to said loading ramp to a retracted position relative to said loading ramp when being pushed by said rear tire as said semitrailer is reversing towards said loading ramp; wherein said sensor unit is configured to send a blocking signal to said guide block when the distance between the rear end of said semitrailer and said loading ramp is below a preset threshold, thereby blocking the movement of said sled; and
  a rain flap isolation device comprising:
  i) a first part integrated into or connected to the sled and comprising a plate or rod adapted for moving between a retracted position and an extended position; and
  ii) an activation means configured for activating the plate or rod to move from the retracted position to the extended position; wherein the plate or rod moves upwards relative to the sled when in the extended position.

A second aspect relates to a system for preventing semitrailer collisions with a loading ramp comprising:
  a sensor unit comprising a sensor and configured for sensing when the rear end of a semitrailer is approaching a loading ramp;
  a guide block adapted to be positioned on the ground, laterally and/or medially to the opening of a loading ramp; wherein the guide block comprises a first wheel blocking means configured as a sled adapted for supporting the tread of a rear tire of said semitrailer, and configured to move, preferably passively, from a forwarded position relative to said loading ramp to a retracted position relative to said loading ramp when being pushed by said rear tire as said semitrailer is reversing towards said loading ramp; wherein said sensor unit is configured to send a blocking signal to said guide block when the distance between said rear end of said semitrailer and said loading ramp is below a preset threshold, wherein said wheel blocking means locks its position in response to said blocking signal, thereby blocking the movement of said sled; wherein the system further comprises:
  a rain flap isolation device adapted for preventing said rear tire and its rain flap from touching each other while said rear tire is positioned within said sled during its movement from a forwarded position relative to said loading ramp to a retracted position relative to said loading ramp when being pushed by said rear tire as said semitrailer is reversing towards said loading ramp.

In principle, the first wheel blocking means is initially positioned at an extended position relative to the loading ramp, where the rear end of the semitrailer is at no risk of colliding with the loading ramp. The semitrailer is reversed until its rear wheel at the driver side reaches the first wheel blocking means. The rain flap isolation device secures that the rain flap of the rear wheel will not get stuck between the rear wheel and the sled, thereby removing the risk of damage. The driver then continues to reverse the semitrailer as the first wheel blocking means continuously supports the rear wheel in a retractive movement, relative to the loading ramp, until the sensor unit sends a blocking signal to the guide block when the distance between the rear end of the semitrailer and the loading ramp is below a preset threshold. In response to the blocking signal, the first wheel blocking means locks its position, and the driver will feel that the semitrailer brakes. He then knows that the semitrailer is in position. Thereby, the semitrailer will never risk colliding with the loading ramp, and the solution is independent on the type of semitrailer.

The sensor unit's sensor is configured for sensing when the rear end of a semitrailer is approaching a loading ramp and is preferably a distance sensor or a laser beam sensor. The term "distance sensor" for the purposes of this invention can be one or more of an infrared sensor, a triangulation sensor, an ultrasonic sensor, or the like, or combinations thereof.

In one or more embodiments, the first wheel blocking means is configured such that the work of the rear wheel of the semitrailer on the wheel blocking means makes the first wheel blocking means move from a forwarded position relative to the loading ramp to a retracted position relative to the loading ramp. Hence, it is only the force of the reversing semitrailer that moves the first wheel blocking means from a forwarded position to a retracted position. Such a specific configuration could e.g. be that the first wheel blocking means is connected to a locking means comprising a toothed rack, and a locking pin; and wherein the locking pin is configured to engage with the toothed rack upon receipt, either directly or indirectly, of a blocking signal from said sensor unit. The toothed rack is preferably positioned along the length of the guide block. The locking pin will then be in a retracted position until the blocking signal is received. Furthermore, the guide block could comprise an elongate guide rail extending along the length of said guide block; wherein the sled comprises:

a distal end, relative to the loading ramp, configured as a ramp;
   a middle segment adapted for supporting the tread of a rear tire of the semitrailer; and
   a proximal end, relative to the loading ramp, configured as an elevation or backstop;
   wherein at least the middle segment is slidably attached to said guide rail.

In one or more embodiments, the sled comprises:

a distal end, relative to the loading ramp, configured as a ramp;
   a middle segment adapted for supporting the tread of a rear tire of the semitrailer; and
   a proximal end, relative to the loading ramp, configured as an elevation or backstop. This configuration allows for the rear tire to fit into sled.

In one or more embodiments, the activation means is a lever pivotably connected to the sled, preferably to the distal end or to the middle end. When the lever is pivoted when the rear tire rests on its free end, the other end of the lever raises the plate or rod. Preferably, the lever has a first end connected to the plate or rod, and a second free end.

In one or more embodiments, the sled comprises:

a distal end, relative to the loading ramp, configured as a ramp;
   a middle segment adapted for supporting the tread of a rear tire of the semitrailer, and comprising a first hole or cavity; and
   a proximal end, relative to the loading ramp, configured as an elevation or backstop;
   wherein the second free end is bent downwards, and adapted for pivoting between a first position above the middle segment and a second position within the first hole or cavity in the middle segment. The shape and position of the free end secures that a tire moving over the lever will not risk being penetrated.

In one or more embodiments, the system further comprises a guide rail adapted for supporting the sled; wherein the sled further comprises a second wheel blocking means; said second wheel blocking means adapted to slidably or rollably engage with said guide rail; wherein the guide rail is configured with one or more elevations along its path; and wherein when the second wheel blocking means engages with said elevations it moves from a retracted position to an elevated position. The wheel support is preferably integrated into the distal end of the sled.

In one or more embodiments, the second wheel blocking means comprises a flap adapted to move from a retracted position to an elevated position, and one or more wheels adapted to rollably engage with the guide rail.

In one or more embodiments, the second wheel blocking means further comprises a support wheel attached to and extending laterally to the flap, and a support and guide rail configured to support and guide said support wheel as the sled is moving between the forwarded position relative to said loading ramp and the retracted position relative to said loading ramp. This configuration strengthens the second wheel blocking means, making it more resistant to the forces exerted on it by the semitrailer.

In one or more embodiments, the system further comprises a locking system adapted to retain and release the sled; wherein the locking system comprises a locking pin, and an anchor positioned below said sled; wherein the locking pin is pivotably attached to the bottom side of said sled; wherein the locking pin comprises a first end adapted for moving from an extended position on the top side of the sled through a hole in said sled to a retracted position within said hole; and a second end adapted for moving from an extended position on the bottom side of said sled to a retracted position also on the bottom side of said sled; wherein the second end of said locking pin is adapted to be engaged with said anchor in its retracted position. This configuration allows the rear tire to get into position before the sled starts to move.

In one or more embodiments, the sled is connected to a locking means comprising a toothed rack, and a locking pin; and wherein the locking pin is configured to engage with the toothed rack upon receipt, either directly or indirectly, of a blocking signal from said sensor unit.

The blocking signal may be transmitted by wires or wireless.

In one or more embodiments, the sled is connected to a locking pin housing adapted to move the locking pin above and along the toothed rack.

In one or more embodiments, the sensor unit, subsequent to a blocking signal, is configured to send a reactivation signal to the guide block when the distance between the rear end of the semitrailer and the loading ramp exceeds a preset threshold, thereby reactivating the guide block to move from a retracted position relative to the loading ramp to a forwarded position relative to the loading ramp.

In one or more embodiments, the guide block comprises a sensor unit configured for sensing when the semitrailer has disengaged therefrom; and wherein the sensor unit is configured to activate the guide block to move from a retracted position relative to the loading ramp to a forwarded position relative to the loading ramp.

A third aspect relates to the use of a system according to the present invention for preventing semitrailer collisions with a loading ramp.

A fourth aspect relates to the use of a system according to the present invention for guiding a semitrailer towards and/or away from a loading ramp.

It should be noted that embodiments and features described in the context of one of the aspects of the present invention also apply to the other aspects of the invention.

DETAILED DESCRIPTION OF THE INVENTION

Figure 1:
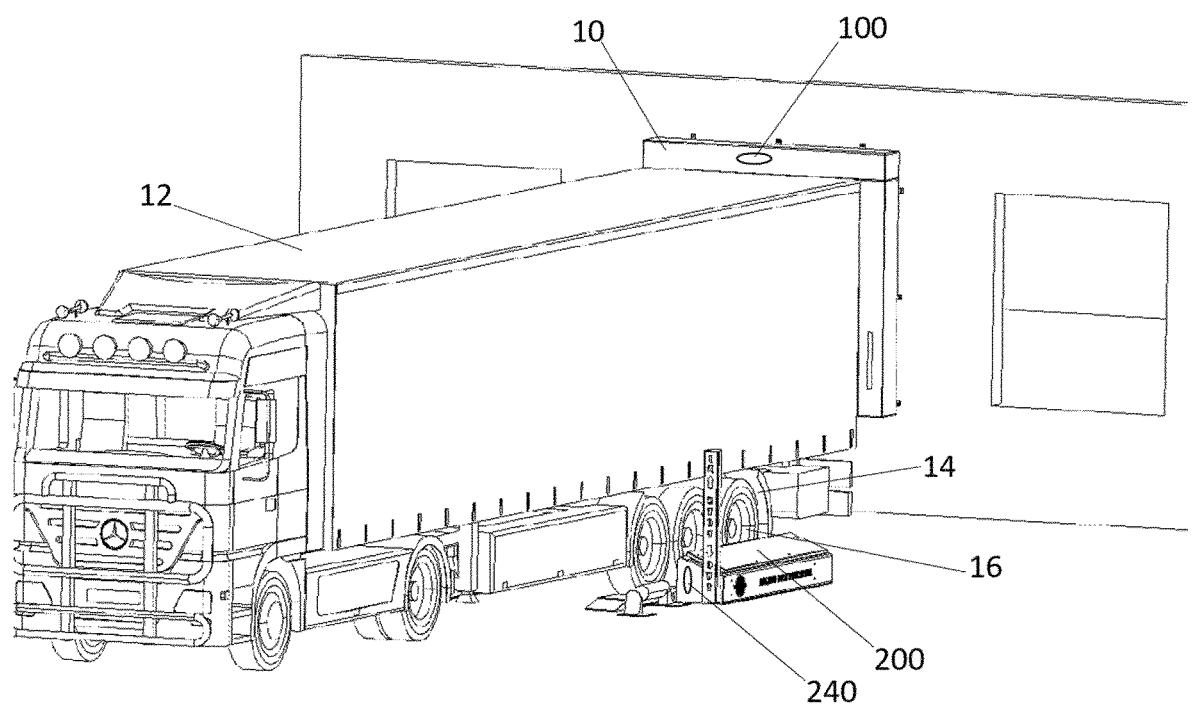
FIG. 1 shows a perspective view of a system in accordance with various embodiments of the invention.
Figure 3:
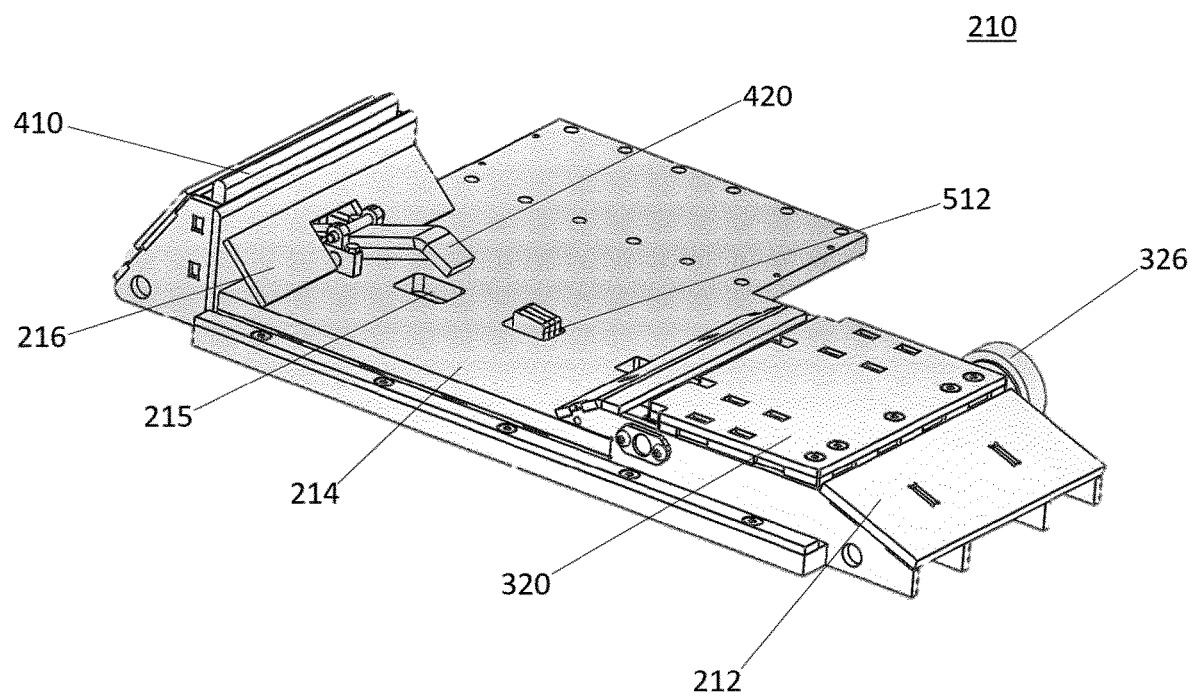
FIG. 3 shows a perspective view of a sled in accordance with various embodiments of the invention.
Figure 5:
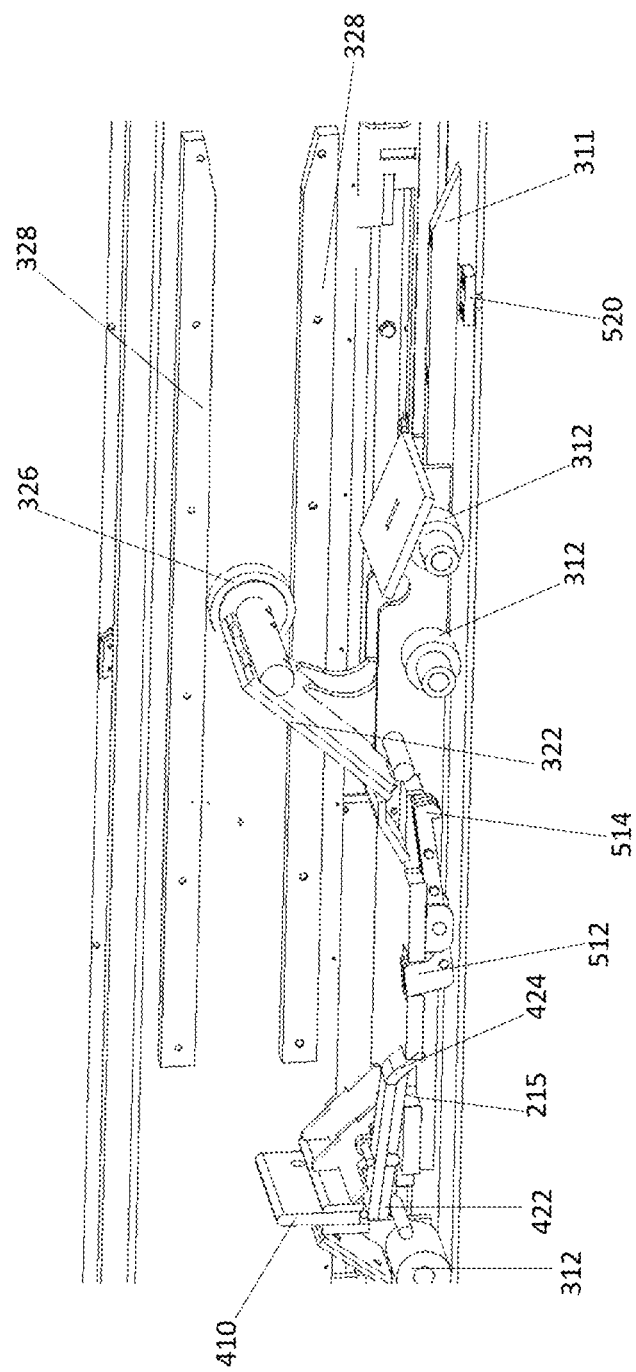
FIG. 5 shows a cross-sectional view of the sled shown in FIG. 4.

Referring to FIG. 1, the general scheme of the invention is shown in perspective view. FIG. 1 shows a system for preventing semitrailer collisions with a loading ramp 10. The system comprises a sensor unit 100 comprising a sensor, a guide block 200, and a rain flap 14 isolation device (410, FIG. 3). The sensor unit 100 is configured for sensing when the rear end of a semitrailer 12 is approaching a loading ramp 10. The guide block 200 is adapted to be positioned on the ground and is here shown positioned laterally to the opening of the loading ramp 10. In FIG. 3, the guide block 200 is shown comprising a first wheel blocking means configured as a sled 210 adapted for supporting the tread of a rear tire 16 of a semitrailer 12. The sled 210 is configured to move, preferably only by the aid of the semitrailer, from a forwarded position relative to said loading ramp 10 to a retracted position relative to said loading ramp 10 when being pushed by said rear tire 16 as said semitrailer 12 is reversing towards said loading ramp 10. To ease its movement across a surface, the sled 210 is provided with wheels 312 (FIG. 5). The sensor unit 100 is configured to send a blocking signal to the guide block 200 when the distance between the rear end of the semitrailer 12 and the loading ramp 10 is below a preset threshold, thereby blocking the movement of the sled 210.

Figure 2:
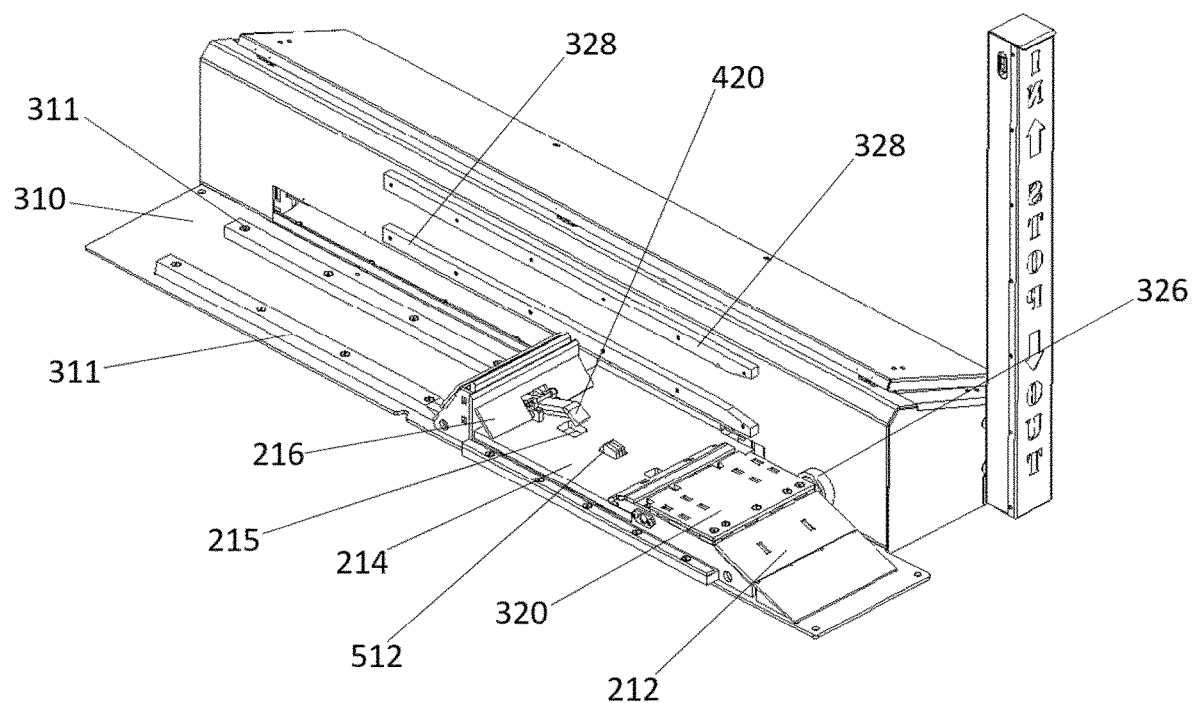
FIG. 2 shows a perspective view of a guide block in accordance with various embodiments of the invention, where the sled is shown in a forwarded position.
Figure 4:
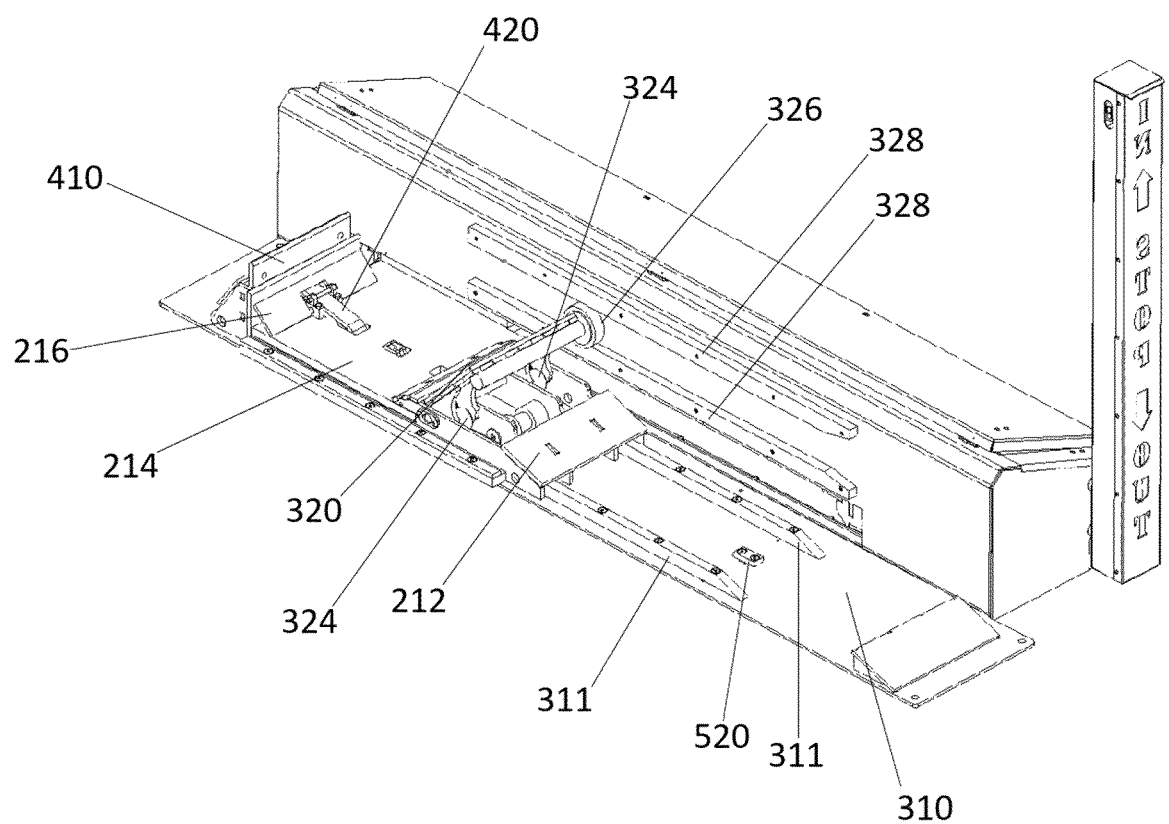
FIG. 4 shows a perspective view of a guide block in accordance with various embodiments of the invention, where the sled is shown in a retracted position.

FIGS. 2-5 show a specific example of a rain flap isolation device in accordance with various embodiments of the invention. The rain flap isolation device secures that the rain flap 14 of the rear wheel 16 will not get stuck between the rear wheel 16 and the sled 210, thereby removing the risk of damage. In general, the rain flap isolation device comprises i) a first part integrated with the sled 210 and comprising a plate 410 adapted for moving between a retracted position and an extended position; and ii) an activation means 420 configured for activating the plate 410 to move from the retracted position to the extended position. The plate 410 moves upwards relative to the sled 210 when in the extended position for mechanically actuated interposition between the rain flap and the rear tire. FIGS. 2 and 3 show the sled in a forwarded position relative to said loading ramp 10, where the plate 420 is in a retracted position as the activation means 420 has not yet been activated by the rear tire of a semitrailer. FIGS. 4 and 5 show the sled in a retracted position relative to said loading ramp 10, where the plate 410 is in an extended position as the activation means 420 has been activated by the rear tire (not shown) of a semitrailer.

To block the rear wheel from moving in either direction, the sled 210 further comprises a second wheel blocking means 320. The system is provided with a guide rail 310 partly adapted for supporting the sled 210 and partly for supporting the second wheel blocking means 320. In FIGS. 2 and 3, the second wheel blocking means 320 is shown in a retracted position, while it is shown in an elevated position in FIGS. 4 and 5.

To strengthen the second wheel blocking means 320, making it more resistant to the forces exerted on it by the semitrailer, the second wheel blocking means 320 is adapted to rollably engage with the guide rail 310 by the aid of wheels 324 (FIG. 4). The guide rail 310 is here shown configured with two parallel elevations 311 supporting the wheels 324. When the second wheel blocking means 320 engages with said elevations 311, the wheels 324 force its flap 322 to move from a retracted position to an elevated position.

To even further strengthen the second wheel blocking means 320, it is provided with a support wheel 326 attached to and extending laterally to the flap 322, and a support including for example a parallel pair of support guide rails 328 configured to support and guide the support wheel 326 as the sled 210 is moving between the forwarded position relative to the loading ramp 10 and the retracted position relative to the loading ramp 10.

To secure the rear tire to get into position before the sled 210 starts to move, the system further comprises a locking system adapted to retain and release the sled 210 (FIGS. 4 and 5). The locking system comprises a locking pin, and an anchor 520 positioned below the sled 210. The locking pin is pivotably attached to the bottom side of said sled 210, and comprises a first end 512 adapted for moving from an extended position on the top side of the sled 210 through a hole in said sled 210 to a retracted position within said hole; and a second end 514 adapted for moving from an extended position on the bottom side of said sled 210 to a retracted position also on the bottom side of said sled. The second end 514 of the locking pin is adapted to be engaged with the anchor 520 in its retracted position (not shown). To ease its movement across a surface, the sled 210 is provided with wheels 312.

Figure 6:
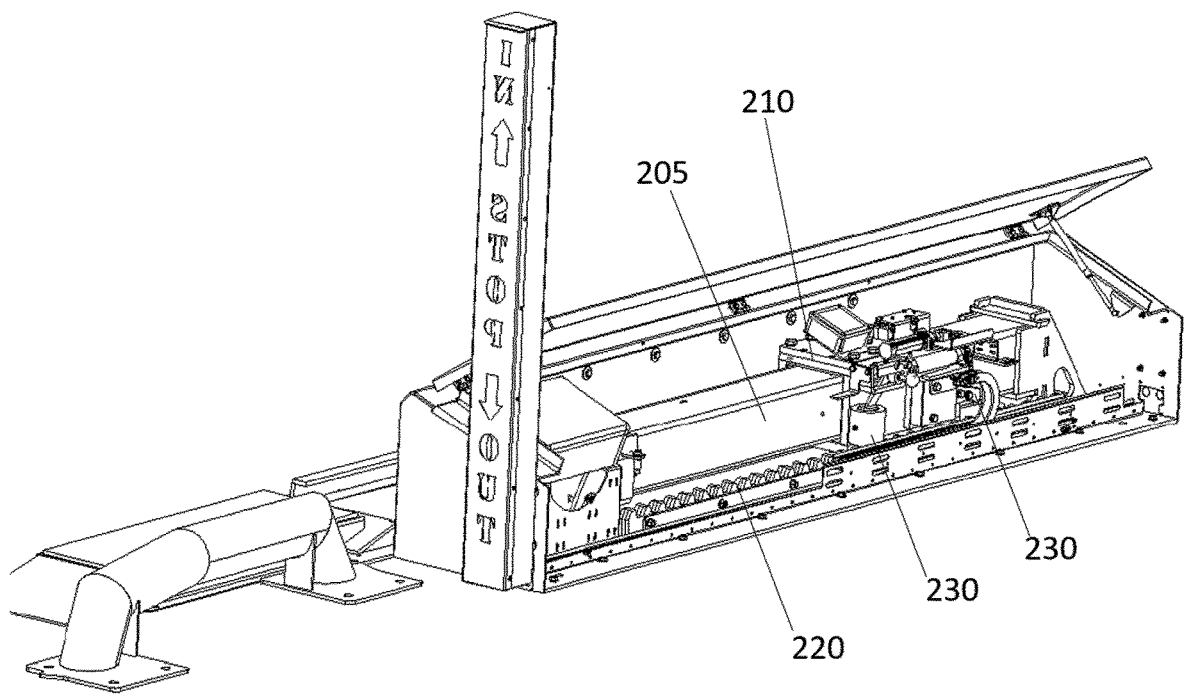
FIG. 6 shows a guide block in accordance with various embodiments of the invention, where the sled (not shown) is connected to a locking means.

FIG. 6 shows a guide block 200 in accordance with various embodiments of the invention, where the sled 210 (a part of it may be seen) is connected to a locking means comprising a toothed rack 220, and two locking pins 230. The two locking pins 230 are attached to the sled 210, and the toothed rack 220 is shown secured to an elongate guide rail 205. The locking pins 230 are configured to engage with or disengage from the toothed rack 220 upon receipt, either directly or indirectly, of a blocking signal from a sensor unit (not shown but could be sensor unit 100 or 240 as seen in FIG. 1). The guide block is shown comprising an elongate guide rail 205 extending along the length of the guide block. The sled 210 is slidably attached to said guide rail 205. The guide rail 205 is here shown as a steel beam, a Hollow Steel Section (HSS) beam, providing sufficient strength to the guide block.

Figure 7:
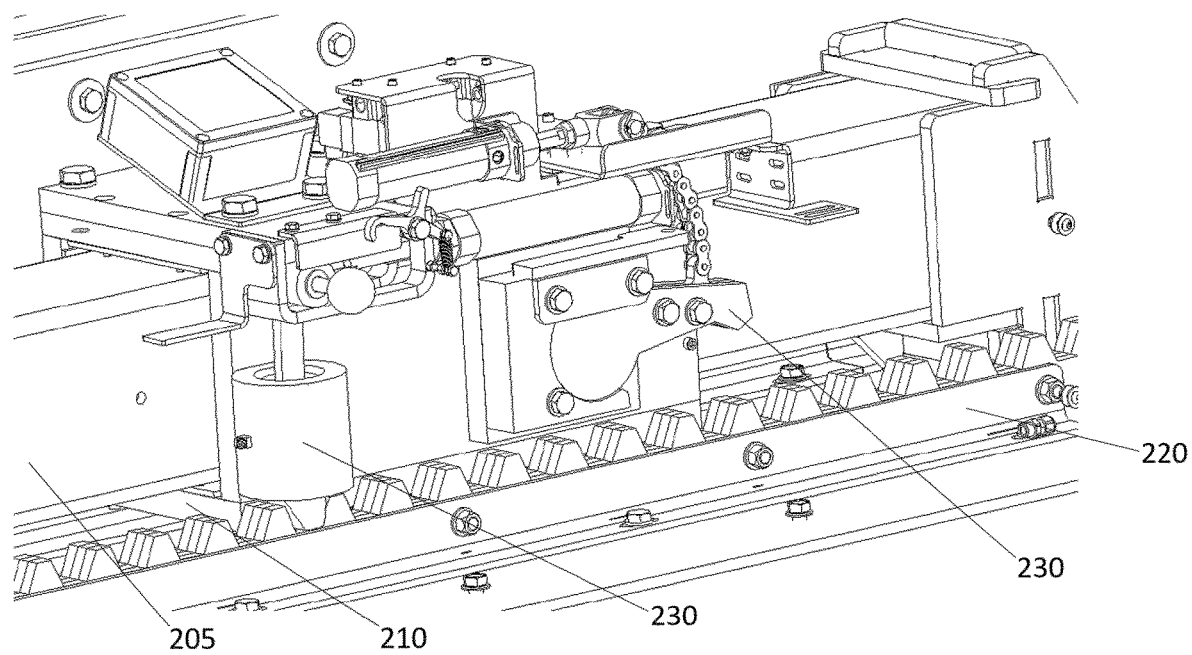
FIG. 7 shows a closeup view of the locking means from FIG. 6.

FIG. 7 shows a closeup view of the locking means from FIG. 6.

REFERENCES

10 Loading ramp
12 Semitrailer
14 Rain flap
16 Rear tire
100 Sensor unit
200 Guide block
205 Guide rail
210 Sled
211 Wheel
212 Distal end
214 Middle segment
215 Hole
216 Proximal end
220 Toothed rack
230 Locking pin
240 Sensor unit 310 Guide rail
311 Elevation
312 Wheel
320 Second wheel blocking means
322 Flap
324 Wheel
326 Wheel
328 Guide and support rail
410 Plate
420 Activation means
422 First lever end
424 Second lever end
512 First locking pin end
514 Second locking pin end
520 Anchor

The invention claimed is:

1. A system for preventing collisions of a semitrailer with a loading ramp (10) comprising:
   a sensor unit (100) comprising a sensor and configured for sensing when a rear end of the semitrailer (12) is approaching an opening of the loading ramp (10);
   a guide block (200) adapted to be positioned on a ground surface, laterally and/or medially to the opening of the loading ramp (10); wherein the guide block (200) comprises a first wheel blocking means configured as a sled (210) adapted for supporting a rear tire (16) of the semitrailer (12), and configured to move passively from a forwarded position relative to the opening of the loading ramp (10) to a retracted position relative to the opening of the loading ramp (10) when pushed by the rear tire (16) as the semitrailer (12) is reversing towards the opening of the loading ramp (10); wherein the sensor unit (100) is configured to send a blocking signal to the guide block (200) when a distance between the rear end of the semitrailer (12) and the opening of the loading ramp (10) is below a preset threshold, wherein the first wheel blocking means locks in a blocking position in response to said blocking signal, thereby blocking the movement of the sled (210); characterized in that the system further comprises:
   a rain flap isolation device configured to prevent a rain flap (14) adjacent the rear tire (16) from touching the rear tire (16) while the rear tire (16) is positioned within the sled (210) during movement of the sled from the forwarded position relative to the opening of the loading ramp (10) to the retracted position relative to the opening of the loading ramp (10) when pushed by the rear tire (16) as the semitrailer (12) is approaching the opening of the loading ramp (10), wherein the rain flap isolation device comprises:
   i) a first part integrated into or connected to the sled (210) and comprising a plate or rod (410) adapted for moving between a retracted position and an extended position; and
   ii) an activation means (420) configured for activating the plate or rod (410) to move from the retracted position to the extended position; wherein the plate or rod (410) moves upwards relative to the sled (210) when in the extended position; wherein the activation means (420) is a lever pivotably connected to the sled (210); wherein the lever has a first end (422) connected to the plate or rod (410), and a second free end (424); and wherein the sled (210) comprises:
   a distal end (212), relative to the opening of the loading ramp (10), configured as a ramp;
   a middle segment (214) adapted for supporting the rear tire of the semitrailer (12), and comprising a first hole or cavity (215); and
   a proximal end (216), relative to the opening of the loading ramp (10), configured as an elevation or backstop;
   wherein the second free end (424) is bent downwards and adapted for pivoting between a first position above the middle segment (214) and a second position within the first hole or cavity (215) in the middle segment (214).

2. A system for preventing collisions of a semitrailer with a loading ramp (10) comprising:
   a sensor unit (100) comprising a sensor and configured for sensing when a rear end of the semitrailer (12) is approaching an opening of the loading ramp (10);
   a guide block (200) adapted to be positioned on a ground surface, laterally and/or medially to the opening of the loading ramp (10); wherein the guide block (200) comprises a first wheel blocking means configured as a sled (210) adapted for supporting a rear tire (16) of the semitrailer (12), and configured to move passively from a forwarded position relative to the opening of the loading ramp (10) to a retracted position relative to the opening of the loading ramp (10) when pushed by the rear tire (16) as the semitrailer (12) is reversing towards the opening of the loading ramp (10); wherein the sensor unit (100) is configured to send a blocking signal to the guide block (200) when a distance between the rear end of the semitrailer (12) and the opening of the loading ramp (10) is below a preset threshold, wherein the first wheel blocking means locks in a blocking position in response to said blocking signal, thereby blocking the movement of the sled (210); characterized in that the system further comprises:
   a rain flap isolation device configured to prevent a rain flap (14) adjacent the rear tire (16) from touching the rear tire (16) while the rear tire (16) is positioned within the sled (210) during movement of the sled from the forwarded position relative to the opening of the loading ramp (10) to the retracted position relative to the opening of the loading ramp (10) when pushed by the rear tire (16) as the semitrailer (12) is approaching the opening of the loading ramp (10), the system further comprising a locking system adapted to retain and release the sled (210); wherein the locking system comprises a locking pin, and an anchor (520) positioned below the sled (210); wherein the locking pin is pivotably attached to a bottom side of the sled (210); wherein the locking pin comprises a first end (512) configured to move from an extended position on a top side of the sled (210) through a hole in said sled (210) to a retracted position within said hole; and a second end (514) configured to move from an extended position on the bottom side of said sled (210) to a retracted position also on the bottom side of said sled; wherein the second end (514) of the locking pin is configured to engage with the anchor (520) in the retracted position of the second end (514) of the locking pin.

* * * * *